A. LOWENSTEIN.
MANUFACTURE OF ANHYDROUS AMMONIA.
APPLICATION FILED AUG. 28, 1916.
1,322,251.
Patented Nov. 18, 1919.
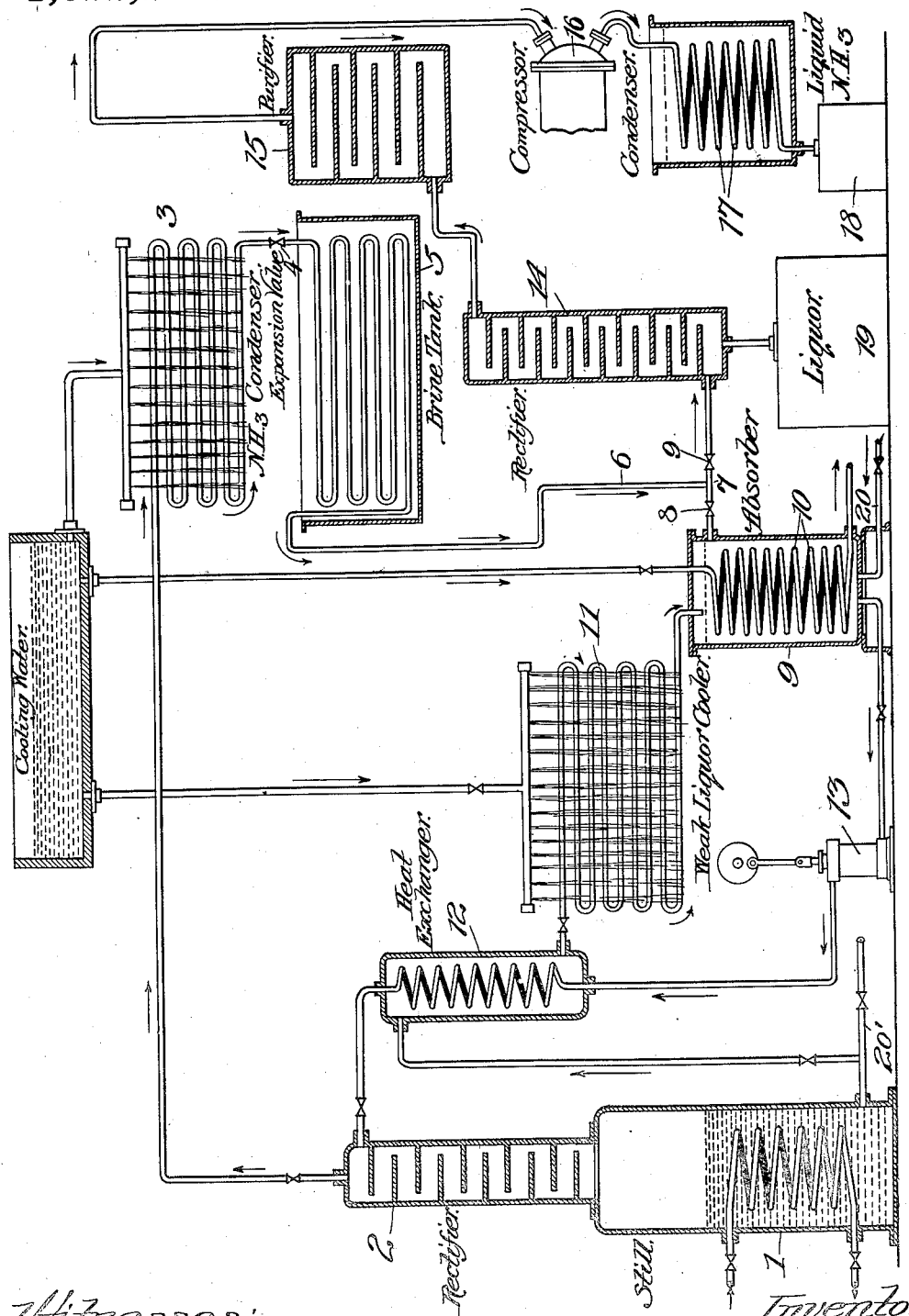

UNITED STATES PATENT OFFICE.

ARTHUR LOWENSTEIN, OF CHICAGO, ILLINOIS.

MANUFACTURE OF ANHYDROUS AMMONIA.

1,322,251.      Specification of Letters Patent.      Patented Nov. 18, 1919.

Application filed August 28, 1916. Serial No. 117,289.

*To all whom it may concern:*

Be it known that I, ARTHUR LOWENSTEIN, a citizen of the United States, residing at Chicago, in the county of Cook and State of Illinois, have invented a new and useful Improvement in the Manufacture of Anhydrous Ammonia, of which the following is a specification.

My invention relates to the art of refrigeration, more particularly to the method of and apparatus for simultaneously operating an ammonia refrigerating system of the absorption type, and obtaining as a product or by-product by such operation anyhdrous ammonia.

The invention will be fully understood from the following detailed description, in connection with the accompanying drawing which illustrates diagrammatically one form of the apparatus constructed according to and designed to be operated in the manner contemplated by the invention.

In this drawing the numeral 1 designates a suitable still into which strong liquor is charged, and in which, under the action of heat, there is produced ammonia gas. This gas passes outwardly through the rectifier 2 which serves to separate the entrained water as is well understood, and from a connection in the top of the rectifier the gas passes to the ammonia condenser 3, suitably cooled as is illustrated in diagram. The rectified liquid ammonia containing a small proportion of water and possibly other impurities is led from the condenser 3 through an expansion valve 4 from which it passes in the expanded gaseous condition into the cooling coils located in the brine-tank 5. From the cooling coils of the brine-tank, the expanded gaseous ammonia passes through a pipe 6 to a T-coupling 7, each arm of which is provided with a valve, as indicated at 8 and 9. Assuming that the valve 8 is open and the valve 9 closed, the gas will then pass to an absorber 9 suitably cooled as by the immersed water coil 10, and kept filled with weak liquor from the weak liquor cooler 11 fed from the still 1 through the heat-exchanger 12. The strong liquor from the absorber 9 will normally be led by a pump 13 through a coil in the heat-exchanger 12 and thence to the top of the rectifier 2, through which it reaches the still.

The apparatus described above is an ordinary form of absorption refrigeration apparatus, the parts operating in the usual and well-understood manner.

To utilize such an apparatus simultaneously with its action as a refrigeration apparatus as a plant for producing anyhdrous ammonia, I provide certain additional equipment which communicates with the refrigeration system through the valve 9.

The additional equipment consists of a rectifier or drier 14, a purifier 15 having the usual staggered trays for supporting the chemical purifying agent connected with the outlet of the rectifier, an ammonia compressor 16 receiving the dried and purified gas from the purifier, a condenser 17 in which the compressed gas is discharged from the compressor and in which it liquefies and a receiver 18 into which the foot of the condenser opens. There is also preferably provided a receiving tank 19 in which the liquor separated from the purified gases in the rectifier is collected.

To complete the apparatus, means should be provided for introducing aqua ammonia into the absorption system, either constantly or intermittently, as required, I have shown such means in the form of a pipe 20 tapped into the absorber 9. There is also provided a pipe $20^1$ for draining off weak liquor from the still.

The operation of my anhydrous ammonia producing plant is as follows:

If a "standard" or reasonably pure grade of aqua ammonia is employed in the absorption system, the cooled and expanded gas in the pipe 6 will be relatively pure. Assuming that the valve 9 is open, this gas will pass through the drying and purifying apparatus 14, 15, and thence to the compressor 16, reaching the latter in a cool, dry and expanded condition and free of all objectionable impurities. By the operation of the compressor, the gas will be compressed to such an extent as to be liquefied in the condenser 17, and there will drain into the receiver 18 therefor pure adhydrous ammonia fitted for industrial use. If desired, suitable connections may be made through which the condenser 17 will be cooled to an exceedingly low temperature by brine from the tank 5, thereby rendering possible the use of a very small compressor.

To supply the deficiency of ammonia in the absorption system, resultant upon the abstraction of gas for the purpose of producing anhydrous ammonia, aqua ammonia will be introduced into the absorption system through the pipe 20 in proper amounts and weak liquor will be withdrawn through the pipe 20¹ to maintain the balance in the system. The weak liquor in the pipe 20¹ may be run to the receiver 19, and the ammonia content of this liquor may be recovered as aqua ammonia in a separate small still according to the usual methods.

Where both compression and absorption systems are in use at the same time and in the same plant, there is a peculiar advantage in my process in that in such cases the compressor 16 may be the ordinary compressor of the compression refrigeration system, that is, the purified and rectified expanded gas abstracted from the absorption system may be fed directly into the intake side of the compressor of the compression system. In such cases no additional equipment whatever will be required, save the necessary pipe connection and the relatively small and inexpensive means for purifying the gas abstracted from the absorption system.

My system is particularly designed for use in plants employing both absorption and compression refrigerating machinery. The ordinary processes of manufacture of anhydrous ammonia are such that (based upon the $NH_3$ content), the price of anhydrous ammonia is practically double that of aqua ammonia.

A considerable saving can be effected if the entire ammonia requirements for the system can be supplied as aqua ammonia, without a proportional expense for effecting the conversion. By the use of my process, and with the relatively inexpensive additional equipment described, the absorption system becomes capable of producing sufficient anhydrous ammonia to care for the requirements of a compression system of several times its capacity. It does not seem to have been hitherto recognized that the absorption system in itself includes practically all the equipment required for the production of anhydrous ammonia from aqua ammonia. The latter material, if purchased according to the "standard" specifications, is so free of all impurities that when dried by the highly efficient rectifiers now commonly employed in modern absorption systems, it requires little, if any, further treatment other than mere compression to convert it into commercial anhydrous ammonia. The use of the absorption system as a still and rectifier for the manufacture of anhydrous ammonia does not in any way influence the operation of the system as a refrigerating system, nor does it add anything to the cost of such operation. It is quite clear that it is immaterial whether ammonia gas be abstracted from the system beyond the brine-coils and fresh aqua ammonia charged into the absorber, or whether the gas be permitted to run directly into the absorber and to there strengthen the weak liquor. Indeed there may be said to be some small advantage in the operation of the absorption system itself, according to my method, in that the aqua ammonia introduced to the pipe 20 will normally be considerably cooler than the weak liquor coming from the still.

It is quite commonly the case that the capacity of the absorption system is largely in excess of refrigeration requirements at certain seasons of the year. If only relatively small quantities of anhydrous ammonia are desired to be produced, it may therefore be sufficient to operate the additional equipment only at these periods when the refrigeration requirements are at the lowest point, and under such conditions it will be advantageous to cool the condenser 17 to the lowest practical temperature from the brine or other refrigerating medium of the absorption system. When cooling the condenser artifically to a very low temperature in this manner, the compressor 16, which forms the largest single factor in the expense of additional equipment, may be of very small size and capacity. As effecting the size of the compressor 16 it should also be noted that the gas which enters this compressor is expanded gas of approximately the minimum temperature of the refrigerating system. There is, therefore, an inherent advantage in the combination of the absorption system and the means for producing anhydrous ammonia.

While I have shown and described in considerable detail one specific form of apparatus together with the preferred process as carried out by the use of this apparatus, it is to be understood that such showing and description is illustrative only and for the purpose of making clear the nature and objects of my invention, and that I do not regard the invention as limited to these details, nor to any of them except in so far as such limitations are included within the terms of the following claims in which it is my intention to claim all novelty inherent in my invention as broadly as is permissible in view of the prior art.

What I claim as new and desire to secure by Letters Patent is:—

1. In the process which consists in heating an aqueous solution of ammonia, condensing, expanding and reabsorbing the gaseous ammonia produced in cyclic repetition for the production of cold, withdrawing a portion of the expanded gaseous ammonia, and adding aqueous ammonia in the cycle to effect its replacement.

2. In the process which consists in heating an aqueous solution of ammonia, condensing, expanding and reabsorbing the gaseous ammonia produced in cyclic repetition for the production of cold, independently subjecting gaseous ammonia in cyclic repetition to compression, condensation and expansion for the production of cold, removing a fractional portion of the expanded gaseous ammonia from the first mentioned cycle and introducing it into the second, and supplying additional quantities of aqueous ammonia to the first mentioned cycle.

ARTHUR LOWENSTEIN.